Aug. 15, 1961 R. L. HUNICKE 2,996,038
APPARATUS FOR IMPREGNATING ELECTROLYTIC CAPACITORS
Filed Oct. 20, 1952 2 Sheets-Sheet 1

INVENTOR.
RAYMOND L. HUNICKE
BY
Connolly and Hutz
HIS ATTORNEYS

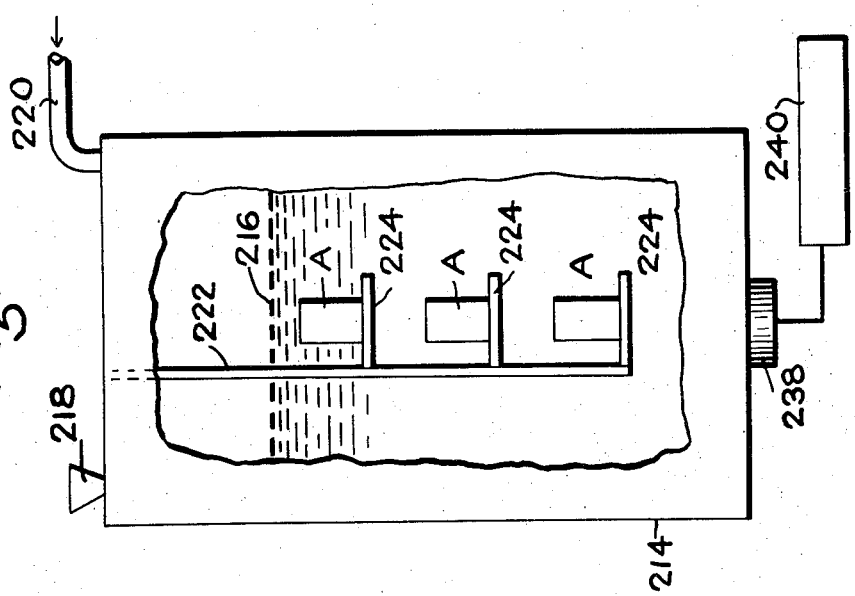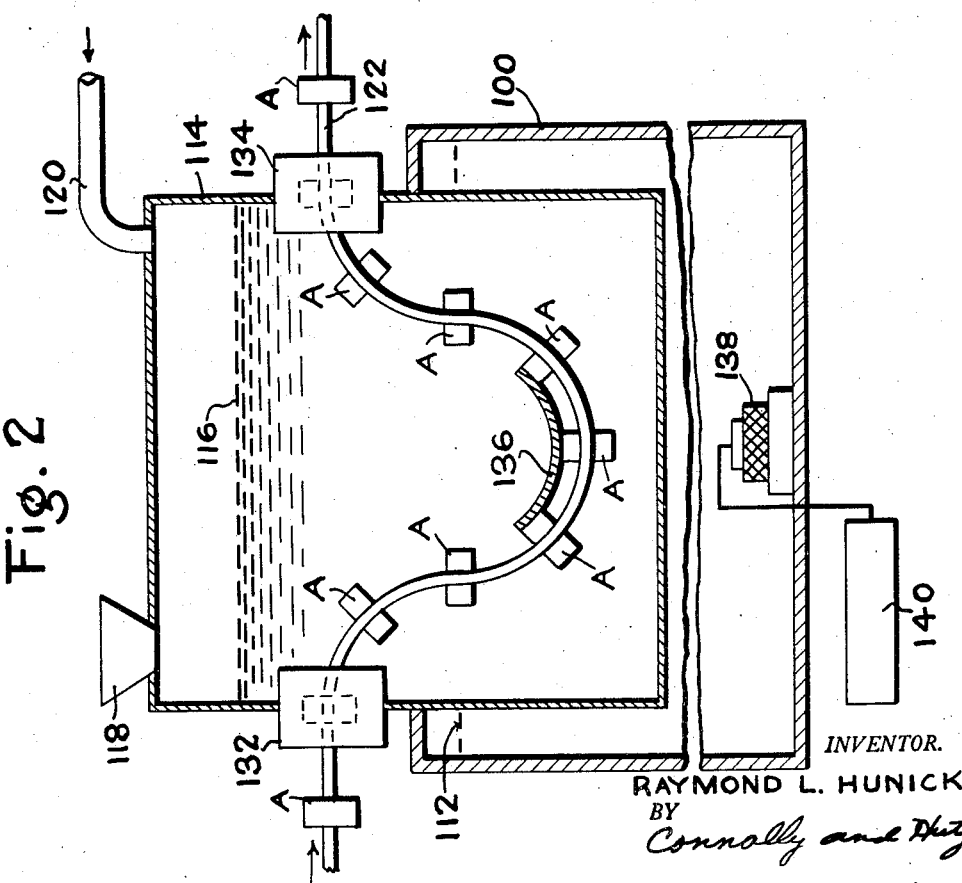

United States Patent Office 2,996,038
Patented Aug. 15, 1961

2,996,038
APPARATUS FOR IMPREGNATING ELECTROLYTIC CAPACITORS
Raymond L. Hunicke, Williamstown, Mass., assignor to Sprague Electric Company, North Adams, Mass., a corporation of Massachusetts
Filed Oct. 20, 1952, Ser. No. 315,772
2 Claims. (Cl. 118—50)

This invention relates to electrolytic type capacitors and more particularly to a process for impregnating such capacitors with an electrolyte.

Electrolytic type capacitors, in which an electrode supporting an oxide film is spaced from a second similar electrode by a suitable low K dielectric spacer, have long been impregnated with various type viscous liquid or gelatinous electrolyte materials by means of soaking the capacitor units in a bath of the electrolyte, maintained in a liquid state at elevated temperatures, for relatively long periods of time. This type of manufacturing procedure while relatively inexpensive requires large working areas and is extremely slow. Attempts have been made to improve the impregnation process by packing the capacitor units in centrifuges to which the electrolyte could be added and thereafter operating the centrifuge at high speeds to force the electrolyte into the spacers under centrifugal force. This operation was successful in speeding up the impregnation process but presented additional difficulty in that it resulted in frequent damaging of the capacitor units due to crushing under the high centrifugal forces encountered.

It is the primary purpose of the instant invention to supplant the slow and laborious soaking procedures of the prior art with a rapid impregnation operation while at the same time avoiding the difficulties encountered in the prior art centrifuge impregnation processes. A further purpose of the instant invention is to increase the efficiency, life and effectiveness of electrolytic capacitors by occluding deleterious gases from the electrolyte. Accordingly, one object of the invention is to provide a system for impregnating electrolytic capacitors without subjecting the same to physical crushing forces. Another object of the invention is the system for fully and completely impregnating large groups of capacitors with electrolyte in a relatively short time and in a relatively small working area. Still another object of the invention is to decrease the equipment and necessary procedures for handling the impregnant.

In one form of the invention a suitable electrolyte is positioned in a container and the capacitors which are to be impregnated are continuously fed thereto while simultaneously applying ultrasonic agitation to the impregnant to thereby expel all gases from the spacer and the surface of the oxide films and replace the same with electrolyte. In another form of the invention groups of capacitors are positioned in an electrolyte bath which is then subjected to direct ultrasonic agitation. Reference will now be made to the drawing in describing specific embodiments of the invention and in which:

FIG. 2 illustrates a modified apparatus for performing the process according to the instant invention; and FIG. 3 illustrates an apparatus for performing a modified process according to the instant invention.

Figure 1:
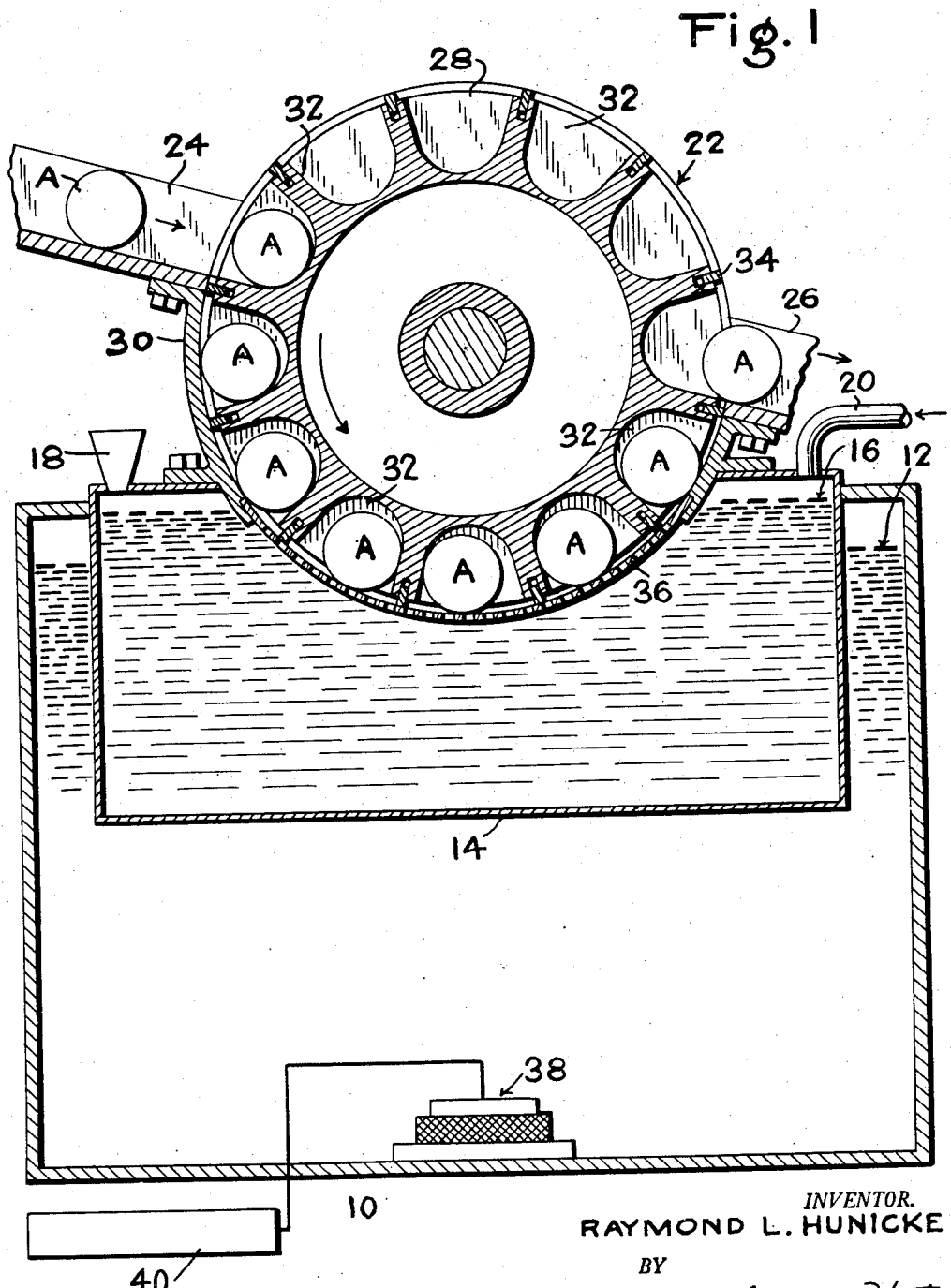
FIG. 1 is a sectional view of an apparatus for performing one process according to the instant invention.

The structure disclosed in FIGURE 1 illustrates an apparatus for performing an electrolyte impregnation process according to the instant invention wherein electrolytic capacitors of the conventional wound foil type may be continuously conveyed to the impregnating unit, subjected for brief periods to an impregnation action, and then transferred to a supplemental station, as for drying, sealing or other conventional manufacturing operations. As shown in the drawing, the apparatus consists of a main or sounding tank 10 in which is disposed a predetermined quantity of liquid 12, preferably oil or water. Through an opening in the top surface of the tank is disposed a second tank or container structure 14. This latter tank contains an impregnant bath 16 of a suitable electrolytic type impregnant such as an ethylene glycol and boric acid mixture. The tank 14 may be supported within the sounding tank 10 by any suitable structure (not illustrated) and may be made adjustable therein by suitable means such as threaded support hangers or the like. On the opposite ends of the upper cover or top surface of tank 14 are positioned an electrolyte feeding chamber or compartment 18 and a fluid conduit or duct 20 for purposes hereinafter apparent.

The electrolyte tank 14 also contains a centrally located opening in its cover surface and into which is positioned a rotary conveyer structure generally indicated by the numeral 22. This conveyer structure includes a feed chute 24 and a discharge chute 26 for respectively transferring articles by gravity to and from the rotary conveyer. As illustrated, the transfer chutes 24 and 26 are formed integral with arcuate guide walls 30 which extend about the periphery of the conveyer into the interior of the tank 14 but it will be understood that such may be separate structures of any convenient design, such as belt conveyers. Preferably, these guide walls include flange elements which make a flush connection with the upper surface of tank 14 to form a fluid and pressure tight seal therewith as by welding or other suitable anti-leak sealing structure. In some instances it may be desirable to interpose a flexible rubber cushion between the conveyer 22 and tank 14 to dampen and/or eliminate transfer of vibrations to the conveyer from the tank.

The conveyer mechanism includes a rotary turntable 28 which is preferably mounted to rotate about a horizontal axis as indicated and includes a plurality of contiguous and integral semi-cylindrical article receptacles or chambers 32, each of which includes opposing side walls which terminate adjacent the periphery of the turntable 28. Suitable conveyor end wall elements (not illustrated for the sake of clarity) may be positioned to overlie the turntable in the region of arcuate walls 30 to form an enclosed chamber. Liquid and pressure tight seal elements 34 are positioned in each of the extending end wall faces of the receptacle walls 32 and preferably project slightly beyond the periphery of the turntable. These seals cooperate with the walls 30 and the end walls or covers (not illustrated) to form a pressure and fluid tight boundary between the exterior and interior of tank 14. The depending arcuate casing walls 30 extend a relatively short distance below the top of tank 14 and support a perforated baffle or grill work 36 for the purpose of preventing gravity discharge of the articles into the impregnant tank.

From the above construction it will be readily appreciated that the electrolytic capacitors A may be readily and easily transferred to and from the impregnant tank 14 without requiring any manual supervision whatsoever. Thus, the capacitor elements A may be transferred from conventional assembly line conveyer belts directly into the chute 24 where they will be gravity fed to the conveyer turntable 28, and in turn, sequentially received within the receptacle chambers 32, conveyed by the rotation of turntable 28 into and immersed within the impregnant bath 16, and subsequently discharged into the transfer chute 26 upon being removed from the impregnant bath, the articles being prevented from dropping into the impregnant bath 16 during their progress through the bath by virtue of the grill work 36.

In order to provide the agitation necessary to produce a speedy impregnation process, a transducing unit 38 is positioned within the sound tank 10 in contact with the liquid 12 and is electrically connected to a power source 40. The transducer 38 may be of any conventional type, either crystal or magneto-strictive; one of the preferred units being a barium titanate crystal. The power source 40 consists of a conventional high-powered, ultra high frequency generator system which is preferably designed to operate in the region of 200 kilocycles and above and at potentials of from 10,000 to 40,000 volts. It will be understood, however, that the frequency range of the oscillator power source 40 may vary widely, as for example, from 20,000 to 250,000 cycles per second with potential variation of from 10 to 60 kvs.

In practicing the process according to the instant invention, it is necessary that the transfer medium 12 for the ultrasonic waves generated by the transducer 38 be acoustically matched therewith, i.e. to have its acoustic impedance as near as possible to the correspondingly optimum electrical coupling impedance for the transducer output. In practice it is preferred to regulate the height of the transfer medium 12 to be equal to a whole number of half wave lengths above the height of the transducer in order to obtain additive effects from the ultrasonic wave emanations. It is also preferred that the impregnant container 14 be constructed as thin walled as possible and as a relatively deep narrow chamber in order that the transfer of ultrasonic energy may be a maximum and to obtain full and efficient transfer of both L and S type waves.

Having generally described the apparatus structures, reference will now be made to the sequential operation thereof in practicing an impregnation process according to the instant invention. In practice the tank is filled with the acoustic transfer medium 12 acoustically matched to provide the desired maximum output adjacent the surface of the liquid, the tank 10 and liquid 12 functioning as an acoustic impedance for the transducer 38. The impregnant tank 14 may then be adjusted to the proper height in such liquid according to the dictates of experience. The viscous impregnant mixture may then be introduced into the tank 14 via the feed chamber 18 to a height sufficient to cover the lower extremities of the extended walls 30 of the conveyer casing. An inert gas such as nitrogen, helium, or argon, etc., is then pumped into the tank 14 under pressure to raise the inner pressure to above atmospheric. This latter feature is made possible by virtue of the fact that the fluid and pressure tight seals 34 cooperate with the opposed arcuate casing side walls 30 of the conveyer mechanism to completely seal the individual receptacle chambers 32 from each other and from the interior of the impregnant tank and positively prevents leaks. It has been discovered that the use of a superatmospheric pressure medium as a cover for the translating liquid 12 increases the efficiency of the process. Articles may now be transferred to the feed chute 24 and the rotary conveyer set into motion by conventional machinery (not illustrated), the rotating turntable 28 receiving the articles in the separate receptacles 32 and transferring them individually in sequential order to be immersed within the impregnant in tank 14.

The power source 40 may now be energized to oscillate the transducer 38 and the coupling medium 12 at ultrasonic frequencies. This operation results in a transfer of additive waves within the coupling medium 12 which reach a maximum in the region of the container 14 and powerfully and effectively agitate the contents of the container 14 causing the expulsion of air from within the capacitor units A and driving the impregnant into the voids thus remaining. The particular theory by which this action proceeds is not presently understood but appears to be related to the collection of the air at the nodes of the ultrasonic wave agitations, and by a subsequent cavitation thereof.

One of the most important advantages of the above process is that it eliminates any necessity for evacuating the individual capacitor articles prior to immersing them in the impregnant, the ultrasonic agitation being substantially sufficient to occlude the air from even the most minute and inaccessible regions within the capacitor wound assembly. Further, due to the fact that ultrasonic agitation consists of extremely localized and powerful forces of relatively short range, the crushing effects of the prior art centrifugal processes are avoided without suffering undue violence to the physical structure of the wound capacitor assembly. In this respect it will be readily understood that in accordance with conventional practice the wound capacitor assemblies are supported within suitable casings or enclosures prior to their being transferred to the feed chute 24.

Another distinctive and important advantage of the instant process resides in the fact that the viscous impregnant is rendered substantially less viscous and therefore more readily able to impregnate all regions of the capacitor through the ultrasonic generation of heat within the liquid body 12. Thus, the efficiency of the unit is substantially increased by eliminating the need for any preheating of the impregnant, the same being easily accomplished within the tank 14 during the agitation of the contents therein. This heat generation is of a particular high order within the interstitial spaces of the capacitors A and is probably one of the primary reasons for the ready transfer of the impregnant thereinto. In view of the fact that the heating effects and temperature ranges depend upon many variable factors including frequency, it may be desirable to provide a conventional cooling system, such as coils, within tank 10 or 14, or both.

A still further distinct advantage results from the fact that the electrolyte impregnant which is normally a mixture such as ethylene glycol and boric acid need not be premixed prior to being introduced into the impregnant tank 14. The ultrasonic agitation localized within such tank effectively disperses the separate ingredients into a highly uniform mixture during the agitation. Thus, each ingredient may be fed from respective storage compartments directly into the impregnant tank where the mixing and combining of the two may take place immediately before or even during the conveying of the articles thereto. In the latter case the feed port 18 may take the form of a charging bin for the boric acid powder and a separate conduit may be provided for the ethylene glycol.

A still further advantage of the instant process will be apparent from the fact that the impregnant may be replenished as is necessary to retain the optimum depth of impregnant within tank 14 without requiring a stoppage of the continuous process. The latter innovation is easily accomplished by incorporating suitable valves in the feed lines for the impregnant, whether as separate constituents or as a mixture, and connecting such valving to an automatic level control mounted within tank 14 in accordance with conventional practices.

In some instances it may be desirable to completely and positively protect against the possibility of any residual air remaining within the impregnated capacitor units. In such case, the end or wall covering surfaces for the conveyer casing 30 (which are not presently illustrated) may be perforated as for example in the region along the arcuate path of the articles on turntable 28 between the feed chute 24 and the top of tank 14. Suitable conduits or ducts may then be connected to the perforations and to a compressor or other power source for producing subatmospheric pressure in the receptacle chambers 32 of the conveyer. With this construction the individual receptacle chambers 32, each containing a capacitor, may be evacuated of air as the receptacle proceeds along its arcuate path from the feed chute to the impregnant tank.

In still other cases it may be desirable to mount the conveyer 22 to rotate about an axis which is inclined to the horizontal so that the open ends of the wound capacitor containers A may be disposed in a downward direction to take full advantage of the L type waves produced by the ultrasonic agitation within the impregnant medium 16. This inclination may vary between 0 and 90° from the horizontal. With an upright or 90 degree inclination the conveyer must necessarily be modified to provide the ends of the capacitor cylinders A with free access to the liquid impregnant bath. This may be easily accomplished by designing the present turntable section 28 as a stationary platform and rotating the receptacle wall structure 32 alone; that portion of the present turntable 28 which would continue to extend into tank 14 being cut away and replaced with grill work such as that of 36 in FIG. 1. With this innovation, the articles A would be carried into and out of the tank 14 in a manner identical to that of FIG. 1 with the exception that the surface 28 functions as a fixed platform over which the articles slide instead of as a rotating part of the conveyer.

FIGURE 2 illustrates a modified structure for practicing an impregnation process according to the instant invention and is substantially identical with that set forth previously with respect to FIGURE 1. In the figure, like numeral subscripts indicate like elements with the exception that the conveyer and liquid pressure seals constructions are different.

As shown, the apparatus of FIGURE 2 includes an impregnant tank 114 mounted in a circular tank 100 in like manner to that previously described. The tank 114 is provided with opposed entrance and exit chambers 132 and 134 respectively, through which a belt- or chain-type conveyer 122 may be threaded. The conveyer 122 is provided with any convenient type article receptacles or holders (not specifically illustrated). The chambers 132 and 134 are constructed in accordance with conventional practices to constitute a liquid and pressure tight gate for permitting ingress and egress of the conveyer and conveyed articles A into and from the tank 114. A baffle or guide plate 136 is positioned within the chamber 114 and functions to guide the belt conveyer 132 and the articles carried thereby in a loop-like path in one continuous, uninterrupted progression.

During their residence within the impregnant chamber 114 the capacitors are subjected to agitation in a manner previously described with respect to FIGURE 1, whereby all air is excluded from between the opposed capacitor electrodes and from within the spacer and impregnant substituted therefor.

If desired, the admission chamber 132 may be constructed to include separate spaced liquid and pressure tight gates or doors adjacent respective terminal ends thereof with an intermediate pressure tight chamber therebetween. With this construction suitable gas evacuating means may be connected with such interior chamber to evacuate air therefrom and therefore from the capacitors as they proceed towards the impregnant tank. This step positively insures complete impregnation of all spaces between the separate electrode surfaces of the capacitor.

In like manner the exit chamber 134 may be provided with separate liquid, pressure tight gates or valves adjacent its respective terminals to thus provide a similar intermediate sealed chamber. A second evacuating mechanism may be applied to this intermediate chamber in like manner to that described with respect to chamber 132 whereby the articles A, after having been immersed in the impregnant 116 and subjected to ultrasonic agitation and impregnation with the electrolyte, may be partially drained or dried of excess electrolyte which may adhere to the capacitor exterior. It will be understood, of course, that the degree of vacuum applied may be controlled so as not to withdraw impregnant from within the capacitor proper.

One of the distinct advantages of the above type arrangement is the elimination of any complicated and/or heavy conveyer equipment and the substantial independent suspension of the capacitors within the agitated bath of impregnant, whereby an added effectiveness is attained.

FIGURE 3 illustrates a still further modified form of the invention which may be described as suitable for batch-type operations in contrast to the previously described continuous processes. Like numerals apply to like elements in the figure.

In this form of the invention the transducer 238 is applied directly to the bottom wall of the impregnant tank 214, whereby the electrolyte impregnant 216 itself functions as the acoustic transfer medium. A conventional type support element 222 is suspended within the tank 214 and includes a plurality of hanger shelves 224 positioned at spaced intervals and upon which are supported a plurality of capacitors in vertically stepped relationship to each other.

In following the process according to this form of the invention the hanger support 222, loaded with the capacitors A, is deposited within the tank in the manner illustrated. The tank is then filled with the electrolyte to a height slightly above the upper capacitor group. An inert gas is then forced into the tank through the conduit 220 to raise the internal pressure to superatmospheric. The oscillator power source 240 may then be energized to generate ultrasonic waves within the electrolyte bath. The ultrasonic agitation produces a uniform dispersement of the electrolyte ingredients while simultaneously elevating the temperature of the bath to thereby render the electrolyte more fluid and to facilitate impregnation, the air being occluded from the capacitors by the agitation and the impregnant substituted therefor. It will be appreciated that if desired the impregnant mixture may be added to the tank and ultrasonically heated, mixed and chemically combined prior to inserting the hanger support 222.

In practical operation it is most desirable to regulate the height of the electrolyte bath 216 to be equal to a whole number of half wave lengths of the frequency of the ultrasonic waves. With this innovation standing waves are produced at spaced depths within the electrolyte with resultant distributions of spaced energy maxima at varying depths. This phenomenon is availed of in the instant case by locating the hanger shelves 224 in the respective regions of the energy maxima so that a plurality of groups of capacitors may be impregnated in a single operational step. It will be apparent that additional electrolyte may be added to the tank as required through the feedport 218.

The common advantages of the different forms of the instant invention herein specifically enumerated include (a) the reduction of the impregnation time required to approximately ⅟₂₀ of that in the prior batch method and ½ of any prior centrifugal methods, (b) eliminating the necessity for any auxiliary or separate heating source for the electrolyte, (c) the simplification of handling of the electrolyte materials by permitting the union thereof within the impregnation chamber, thus eliminating the need for accessory mixing vats or tanks, and (d), most important of all, the elimination of any need for preliminary evacuation of air from the individual capacitor containers.

It will be apparent to those skilled in the art that the spirit of the invention is not necessarily confined to the specific steps or apparatus illustrated and that other innovations not departing from the scope of the instant invention may be applied; as for example, the transducer 38 of FIGURE 1 in lieu of being mounted on the floor of the tank may be positioned on a side wall thereof directly opposing that portion of the impregnant tank 14 which is aligned with the immersed capacitors. In such case the tank 14 could be modified to be of low height and relatively large floor area to compensate for the incidence angle of the ultrasonic waves.

While the invention is primarily described with reference to electrolytic capacitors of the so-called dry type in which a glycol electrolyte system is employed, it will be understood by those skilled in the art that other types of viscous solutions may be employed in like manner. Such other types may include aqueous systems containing inorganic salts, acids or bases, gelled with organic starches or gums, or equivalent compounds, as for example, gum tragacanth or arabic, dextrose, potato starch and polyvinyl alcohol.

It is of particular interest to note that in some of the mixing operations performed with the above type materials the ultra-sonic agitation performs dual and apparently contradictory functions in first dispersing and uniformly mixing the materials while heating the mixture to render it less viscous and more capable of speedy impregnation, and secondly, subsequently causing the mixture to be firmly gelled in the article to produce a "dry" capacitor unit. In this instance the timing is arranged so that the final stages of the gelling action, in the case of continuous processes, takes place as the article is emerging from the impregnant bath; or, in the case of batch processes, the agitation is stopped at this point and the impregnated capacitors removed.

This remarkable result proceeds without being extended into the bath proper, its localized effect being apparently attributable to the fact that the internal temperature in the individual capacitor units is higher than that of the bath proper.

This invention can additionally be utilized for the impregnation of capacitors having porous and non-porous dielectric spacers with various insulating oils and the impregnation of units having cooperating foils separated by a porous dielectric with liquid monomers and partially polymerized polymers for subsequent polymerization of a resin in situ.

As many apparently widely different embodiments of the invention may be made without departing from the spirit and scope hereof, it is to be understood that the above invention is not limited, except as defined in the appended claims.

What is claimed is:

1. In combination, a pressure tight hollow container, a liquid electrolytic capacitor electrolyte in said container, rotary compartment means connected with said container for carrying capacitors through the electrolyte, said means having inlet and outlet passageways opening outside of the container and pressure sealing means at said inlet and outlet to maintain a pressure differential between the interior and exterior of said container, and wave generating means connected to said container for ultrasonically agitating the electrolyte.

2. A capacitor impregnating apparatus having a container, a liquid capacitor impregnant in the container, rotary compartment means in the upper portion of the container and having pressure-sealed inlet and outlet passageways opening outside of the container providing a pressure-tight assembly for receiving capacitors, carrying them through the impregnant, and discharging them, and wave generating means connected to the container for ultrasonically agitating the impregnant.

References Cited in the file of this patent

UNITED STATES PATENTS

| | | |
|---|---|---|
| 1,254,918 | Machin | Jan. 29, 1918 |
| 1,318,740 | Fessenden | Oct. 14, 1919 |
| 2,107,780 | Danziger et al. | Feb. 8, 1938 |
| 2,120,816 | Schnoll | June 14, 1938 |
| 2,288,633 | Luckhaupt | July 7, 1942 |
| 2,407,462 | Whiteley | Sept. 10, 1946 |
| 2,550,453 | Coggeshall | Apr. 24, 1951 |
| 2,594,096 | Trigg | Apr. 22, 1952 |
| 2,637,535 | Arnold | May 5, 1953 |
| 2,657,668 | Maier | Nov. 3, 1953 |

FOREIGN PATENTS

| | | |
|---|---|---|
| 548,960 | Great Britain | Oct. 30, 1942 |